United States Patent
Wei et al.

(10) Patent No.: US 11,438,934 B2
(45) Date of Patent: Sep. 6, 2022

(54) RANDOM ACCESS METHOD AND APPARATUS

(71) Applicant: Huawei Technologies Co., Ltd., Shenzhen (CN)

(72) Inventors: Dongdong Wei, Shanghai (CN); Fan Wang, Berkshire (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 17/081,765

(22) Filed: Oct. 27, 2020

(65) Prior Publication Data

US 2021/0076428 A1    Mar. 11, 2021

Related U.S. Application Data

(63) Continuation of application No. PCT/CN2019/083512, filed on Apr. 19, 2019.

(30) Foreign Application Priority Data

Apr. 28, 2018   (CN) .......................... 201810404040.0

(51) Int. Cl.
*H04W 74/08*   (2009.01)
*H04L 5/00*   (2006.01)

(52) U.S. Cl.
CPC ....... *H04W 74/0833* (2013.01); *H04L 5/0048* (2013.01)

(58) Field of Classification Search
None
See application file for complete search history.

(56) References Cited

U.S. PATENT DOCUMENTS 10,903,958 B2 *   1/2021   Shin .................... H04B 7/0478
2017/0374686 A1   12/2017   Agarwal et al.
(Continued)

FOREIGN PATENT DOCUMENTS

| CN | 101472345 A | 7/2009 |
|---|---|---|
| CN | 102685892 A | 9/2012 |

(Continued)

OTHER PUBLICATIONS

"Considerations on the Contents of RAR for MTC," Agenda Item: 7.2.1.7, Source: Huawei, HiSilicon, Document for: Discussion and decision, 3GPP TSG RAN WG1 Meeting #82bis, R1-155107, Malmo, Sweden, Oct. 5-9, 2015, 3 pages.

(Continued)

*Primary Examiner* — Andrew C Oh
(74) *Attorney, Agent, or Firm* — Slater Matsil, LLP

(57) ABSTRACT

A random access method and apparatus are provided. The method includes sending, by a first terminal side device, a random access preamble to a network side device, receiving, by the first terminal side device, a random access response (RAR) corresponding to the random access preamble, where the RAR includes P temporary cell radio network temporary identifiers (TC-RNTIs), and P is an integer greater than 1, and sending, by the first terminal side device to the network side device based on the RAR, a first message and a demodulation reference signal used to demodulate the first message, where the demodulation reference signal is generated based on a first TC-RNTI, and the first TC-RNTI is one of the P TC-RNTIs.

20 Claims, 9 Drawing Sheets

(56) References Cited

U.S. PATENT DOCUMENTS

| | | | |
|---|---|---|---|
| 2018/0007590 A1 | 1/2018 | Karout et al. | |
| 2018/0110057 A1* | 4/2018 | Park | H04B 7/0452 |
| 2019/0215124 A1* | 7/2019 | Bendlin | H04L 5/0094 |
| 2019/0268089 A1* | 8/2019 | Fu | H04L 1/0026 |

FOREIGN PATENT DOCUMENTS

| | | | | |
|---|---|---|---|---|
| CN | 106416115 A | | 2/2017 | |
| CN | 107493608 A | | 12/2017 | |
| CN | 107534893 A | | 1/2018 | |
| EP | 2214445 A1 | * | 8/2010 | H04W 72/048 |
| EP | 2575283 A1 | | 4/2013 | |
| JP | 5162699 B1 | * | 3/2013 | H04J 13/22 |
| JP | 2013118646 A | * | 6/2013 | |
| JP | 5379254 B2 | * | 12/2013 | H04L 1/0057 |
| JP | 2014057361 A | * | 3/2014 | H04J 13/0059 |
| WO | WO-2012067448 A2 | * | 5/2012 | H04L 5/0007 |
| WO | WO-2013056593 A1 | * | 4/2013 | H04L 5/0053 |
| WO | WO-2016206497 A1 | * | 12/2016 | H04W 72/042 |
| WO | WO-2017171322 A2 | * | 10/2017 | H04L 5/0055 |

OTHER PUBLICATIONS

"Random Access for MTC," Source: Ericsson, Agenda Item: 6.2.1.10, Document for: Discussion and Decision, 3GPP TSG RAN WG1 Meeting #83, R1-156420, Anaheim, USA, Nov. 15-22, 2015, 10 pages.

"RA Issues for Msg3 Based SI Request Procedure," Agenda item: 10.3.1.4.3, Source: Samsung, Document for: Discussion & Decision, 3GPP TSG-RAN2 101, R2-1801873, Athens, Greece, Feb. 26-Mar. 2, 2018, 3 pages.

"Summary of Informal Email Discussion for Physical Layer Aspects of Random Access Transmission," Agenda Item: 6.2.1.10, Source: Huawei, HiSilicon, Document for: Discussion and Decision, 3GPP TSG RAN WG1 Meeting #83, R1-157512, Anaheim, USA, Nov. 15-22, 2015, 43 pages.

"Correction of Cyclic Hopping Term for PUSCH DMRS in CE Mode B (TS 36.211)," Source to WG: NEC, Panasonic, Work item Code: LTE_MTCe2_L1-Core, Category: F, Release: Rel-13, 3GPP TSG-RAN WG1 Meeting #85, R1-164488, Nanjing, China, May 23-27, 2016, 4 pages.

"RA Contention Mitigation in NR," Agenda item: 10.3.1.4.3, Source: Qualcomm Incorporated, WID/SID: RR-170847—Release 15, Document for: Discussion and Decision, 3GPP TSG-RAN WG2 Meeting#NR adhoc2, R2-1707316, Qingdao, China, Jun. 27-29, 2017, 2 pages.

"MAC RAR PDU Design," Agenda Item: 10.3.1.4.3, Source: Ericsson, Document for: Discussion, Decision, 3GPP TSG-RAN WG2 #99, Tdoc R2-1708193, Berlin, Germany, Aug. 21-25, 2017, 4 pages.

* cited by examiner

| 0 | 1 | 2 | 3 | 4 | 5 | 6 | 7 |

| R | Timing advance command |||||||
| Timing advance command |||| Uplink grant ||||
| Uplink grant ||||||||
| Uplink grant ||||||||
| Identifier indication information ||||||||
| Identifier indication information ||||||||

RANDOM ACCESS METHOD AND APPARATUS

CROSS-REFERENCE TO RELATED APPLICATIONS

This application is a continuation of International Application No. PCT/CN2019/083512, filed on Apr. 19, 2019, which claims priority to Chinese Patent Application No. 201810404040.0, filed on Apr. 28, 2018. The disclosures of the aforementioned applications are hereby incorporated by reference in their entireties.

TECHNICAL FIELD

This application relates to the field of communications technologies, and in particular, to a random access method and apparatus.

BACKGROUND

In a mobile communications system such as a long term evolution (LTE) system or a new radio (NR) system, to implement uplink data transmission, a terminal side device establishes a connection to a network side device through a random access procedure, thereby implementing uplink synchronization. The random access procedure includes a contention-based random access procedure and a non-contention-based random access procedure.

Currently, in a contention-based random access procedure, a terminal side device randomly selects a random access preamble from a random access preamble set, and sends the selected random access preamble to a network side device, so that a random access procedure is initiated. If a plurality of terminal side devices simultaneously initiate random access procedures, the network side device allows access of only one terminal side device, and ignores a random access preamble sent by another terminal side device. Consequently, random access of at most one terminal side device succeeds at a time.

In conclusion, after failing to access the network side device through the contention-based random access procedure, the terminal side device needs to re-initiate a random access procedure, resulting in a relatively long average access delay of the terminal side device. Especially in a satellite communications scenario, a unidirectional transmission delay for the satellite communications scenario may reach a maximum of more than 100 milliseconds, resulting in a longer average access delay. Therefore, how to increase a random access success rate of the terminal side device is an urgent problem to be resolved.

SUMMARY

Embodiments of this application provide a random access method and apparatus, to improve a random access success rate of a terminal side device and reduce an average access delay of the terminal side device.

According to a first aspect, an embodiment of this application provides a random access method. The method includes sending, by a first terminal side device, a random access preamble to a network side device, receiving, by the first terminal side device, a random access response (RAR) corresponding to the random access preamble, where the RAR includes P temporary cell radio network temporary identifiers (TC-RNTIs), and P is an integer greater than 1, and sending, by the first terminal side device to the network side device based on the RAR, a first message and a demodulation reference signal used to demodulate the first message, where the demodulation reference signal is generated based on the first TC-RNTI, and the first TC-RNTI is one of the P TC-RNTIs.

In the foregoing solution, the first TC-RNTI is selected by the first terminal side device from the P TC-RNTIs. Therefore, a probability that the demodulation reference signal generated based on the first TC-RNTI is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, because the RAR includes the P TC-RNTIs, theoretically, a maximum of P terminal side devices can simultaneously initiate random access to the network side device, thereby reducing the average random access latency.

According to a second aspect, an embodiment of this application provides a random access method, including receiving, by a network side device, a random access preamble from a first terminal side device, sending, by the network side device, a random access response RAR corresponding to the random access preamble, where the RAR includes P temporary cell radio network temporary identifiers TC-RNTIs, and P is an integer greater than 1, and receiving, by the network side device, a first message sent by the first terminal side device based on the RAR, and a demodulation reference signal that is generated based on the first TC-RNTI to demodulate the first message and that is sent by the first terminal side device based on the RAR, where the first TC-RNTI is one of the P TC-RNTIs.

In the foregoing solution, the first TC-RNTI is selected by the first terminal side device from the P TC-RNTIs. Therefore, a probability that the demodulation reference signal generated based on the first TC-RNTI is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, because the RAR includes the P TC-RNTIs, theoretically, a maximum of P terminal side devices can simultaneously initiate random access to the network side device, thereby reducing the average random access latency.

According to a third aspect, an embodiment of this application provides a random access method, including sending, by a first terminal side device, a random access preamble to a network side device, receiving, by the first terminal side device, a random access response RAR corresponding to the random access preamble, where the RAR includes identifier indication information, and the identifier indication information is used to indicate the first terminal side device to determine a first TC-RNTI in P temporary cell radio network temporary identifiers TC-RNTIs, and sending, by the first terminal side device to the network side device based on the RAR, a first message and a demodulation reference signal that is generated based on the first TC-RNTI to demodulate the first message.

In the foregoing solution, the first TC-RNTI is selected by the first terminal side device from the P TC-RNTIs. Therefore, a probability that the demodulation reference signal generated based on the first TC-RNTI is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, theoretically, a maximum of P terminal side devices can simultaneously initiate random access to the network side device, thereby reducing the average random access latency.

According to a fourth aspect, an embodiment of this application provides a random access method, including receiving, by a network side device, a random access preamble from a first terminal side device, sending, by the network side device, a random access response RAR corresponding to the random access preamble, where the RAR includes identifier indication information, and the identifier indication information is used to indicate the first terminal side device to determine a first TC-RNTI in P temporary cell radio network temporary identifiers TC-RNTIs, and receiving, by the network side device, a first message sent by the first terminal side device based on the RAR, and a demodulation reference signal that is generated based on the first TC-RNTI to demodulate the first message and that is sent by the first terminal side device based on the RAR.

In the foregoing solution, the first TC-RNTI is selected by the first terminal side device from the P TC-RNTIs. Therefore, a probability that the demodulation reference signal generated based on the first TC-RNTI is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, theoretically, a maximum of P terminal side devices can simultaneously initiate random access to the network side device, thereby reducing the average random access latency.

In an optional implementation, when the first terminal side device supports sending uplink data by using a single-carrier frequency division multiple access (SC-FDMA) technology, the demodulation reference signal is generated based on a cyclic shift field or a cyclic shift value, and the cyclic shift field or the cyclic shift value is determined based on the first TC-RNTI.

In an optional implementation, the cyclic shift field is an index value of the first TC-RNTI. The implementation is easy to be implemented, and no complex calculation is required, so that efficiency of generating the demodulation reference signal by the first terminal side device can be improved.

In another optional implementation, each of the P TC-RNTIs has a mapping relationship with a preset value, and the cyclic shift field is a preset value to which the first TC-RNTI is mapped. In this implementation, a quantity of TC-RNTIs included in the RAR may be not limited, and the network side device may determine, based on an actual requirement, the quantity of TC-RNTIs carried in the RAR.

Optionally, the cyclic shift field is mod(the first TC-RNTI, T), T is a quantity of values included in a value range of the cyclic shift field, and mod( ) is a modulo operation.

In an optional implementation, the cyclic shift value is mod(the first TC-RNTI, Y), and Y is a quantity of values included in a value range of the cyclic shift value. In this implementation, the first terminal side device may directly determine the cyclic shift value required for generating the demodulation reference signal, so that efficiency of generating the demodulation reference signal by the first terminal side device can be improved.

In an optional implementation, when the first terminal side device supports sending uplink data by using a single-carrier frequency division multiple access SC-FDMA and/or an orthogonal frequency division multiplexing OFDM technology, the demodulation reference signal is generated based on an antenna port number, and the antenna port number is determined based on the first TC-RNTI.

In an optional implementation, the antenna port number is an index value of the first TC-RNTI, or each of the P TC-RNTIs has a mapping relationship with a preset value, and the antenna port number is a preset value to which the first TC-RNTI is mapped. The implementation is easy to be implemented, and no complex calculation is required, so that efficiency of generating the demodulation reference signal by the first terminal side device can be improved.

Optionally, the antenna port number is mod(the first TC-RNTI, U), and U is a quantity of values included in a value range of the antenna port number. In this implementation, the first terminal side device may directly determine the antenna port number required for generating the demodulation reference signal, so that efficiency of generating the demodulation reference signal by the first terminal side device can be improved.

In an optional implementation, the P TC-RNTIs are preconfigured in a protocol, or the P TC-RNTIs are broadcast by the network side device to the first terminal side device by using a system message.

According to a fifth aspect, an embodiment of this application provides a terminal side device, where the terminal side device includes a memory, a transceiver, and a processor. The memory is configured to store an instruction, and the processor is configured to: execute the instruction stored in the memory, and control the transceiver to send and receive a signal. When executing the instruction stored in the memory, the processor is configured to perform the method according to any one of the first aspect or the possible designs of the first aspect, or perform the method according to any one of the third aspect or the possible designs of the third aspect.

According to a sixth aspect, an embodiment of this application provides a terminal side device, configured to implement any one of the first aspect, the third aspect, the method in the first aspect, or the method in the third aspect. The terminal side device includes corresponding functional modules, for example, including a processing unit, a receiving unit, and a sending unit, each configured to implement the steps in the foregoing method.

According to a seventh aspect, an embodiment of this application provides a network side device, where the network side device includes a memory, a transceiver, and a processor. The memory is configured to store an instruction, and the processor is configured to: execute the instruction stored in the memory, and control the transceiver to send and receive a signal. When executing the instruction stored in the memory, the processor is configured to perform the method according to any one of the second aspect or the possible designs of the second aspect, or perform the method according to any one of the fourth aspect or the possible designs of the fourth aspect.

According to an eighth aspect, an embodiment of this application provides a network side device, configured to implement any one of the second aspect, the fourth aspect, the method in the second aspect, or the method in the fourth aspect. The network side device includes corresponding functional modules, for example, including a processing unit, a receiving unit, and a sending unit, each configured to implement the steps in the foregoing method.

According to a ninth aspect, an embodiment of this application provides a computer-readable storage medium. The computer storage medium stores a computer-readable instruction, and when a computer reads and executes the computer-readable instruction, the computer is enabled to perform the method according to any one of the foregoing aspects or any one of the possible designs of any one of the foregoing aspects.

According to a tenth aspect, an embodiment of this application provides a computer program product. When a computer reads and executes the computer program product, the computer is enabled to perform the method according to any one of the foregoing aspects or any one of the possible designs of any one of the foregoing aspects.

According to an eleventh aspect, an embodiment of this application provides a chip. The chip is connected to a memory, and is configured to read and execute a software program stored in the memory, to implement the method according to any one of the foregoing aspects or any one of the possible designs of any one of the foregoing aspects.

According to a twelfth aspect, an embodiment of this application provides a random access method, including sending, by a first terminal side device, a random access preamble to a network side device, receiving, by the first terminal side device, a random access response RAR corresponding to the random access preamble, where the RAR includes parameter indication information, the parameter indication information is used to indicate F parameters, and F is an integer greater than 1, sending, by the first terminal side device to the network side device based on the RAR, a first message and a demodulation reference signal used to demodulate the first message, where the demodulation reference signal is generated based on a first parameter, and the first parameter is one of the F parameters, and receiving, by the first terminal side device, a contention resolution message of the network side device, where the contention resolution message is sent after the network side device demodulates, based on the demodulation reference signal, the first message.

In the foregoing solution, the demodulation reference signal is generated by the first terminal side device based on the first parameter selected from the F parameters. Therefore, a probability that the demodulation reference signal generated based on the first parameter is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, theoretically, a maximum of F terminal side devices can simultaneously initiate random access to the network side device, thereby reducing the average random access latency.

According to a thirteenth aspect, an embodiment of this application provides a random access method, including receiving, by a network side device, a random access preamble from a first terminal side device, sending, by the network side device, a random access response RAR corresponding to the random access preamble, where the RAR includes parameter indication information, the parameter indication information is used to indicate F parameters, and F is an integer greater than 1, and receiving, by the network side device, a first message sent by the first terminal side device based on the RAR, and a demodulation reference signal that is used to demodulate the first message and that is sent by the first terminal side device based on the RAR, where the demodulation reference signal is generated based on a first parameter, and the first parameter is one of the F parameters.

In the foregoing solution, the demodulation reference signal is generated by the first terminal side device based on the first parameter selected from the F parameters. Therefore, a probability that the demodulation reference signal generated based on the first parameter is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, theoretically, a maximum of F terminal side devices can simultaneously initiate random access to the network side device, thereby reducing the average random access latency.

In an optional implementation, when the first terminal side device supports sending uplink data by using an SC-FDMA technology, a parameter type of the F parameters indicated by the parameter indication information is a cyclic shift field or a cyclic shift value.

In an optional implementation, when the first terminal side device supports sending uplink data by using an SC-FDMA technology and/or an OFDM technology, a parameter type of the F parameters indicated by the parameter indication information is an antenna port number.

According to a fourteenth aspect, an embodiment of this application provides a terminal side device, where the terminal side device includes a memory, a transceiver, and a processor. The memory is configured to store an instruction, and the processor is configured to: execute the instruction stored in the memory, and control the transceiver to send and receive a signal. When executing the instruction stored in the memory, the processor is configured to perform the method according to any one of the twelfth aspect or the possible designs of the twelfth aspect.

According to a fifteenth aspect, an embodiment of this application provides a terminal side device, configured to implement any one of the twelfth aspect or the method in the twelfth aspect. The terminal side device includes corresponding functional modules, for example, including a processing unit, a receiving unit, and a sending unit, each configured to implement the steps in the foregoing method.

According to a sixteenth aspect, an embodiment of this application provides a network side device, where the network side device includes a memory, a transceiver, and a processor. The memory is configured to store an instruction, and the processor is configured to: execute the instruction stored in the memory, and control the transceiver to send and receive a signal. When executing the instruction stored in the memory, the processor is configured to perform the method according to any one of the thirteenth aspect or the possible designs of the thirteenth aspect.

According to a seventeenth aspect, an embodiment of this application provides a network side device, configured to implement any one of the thirteenth aspect, the fourth aspect, the method in the thirteenth aspect, or the method in the fourth aspect. The network side device includes corresponding functional modules, for example, including a processing unit, a receiving unit, and a sending unit, each configured to implement the steps in the foregoing method.

BRIEF DESCRIPTION OF THE DRAWINGS

FIG. 5 is a schematic structural diagram of an RAR according to an embodiment of this application;

DETAILED DESCRIPTION OF ILLUSTRATIVE EMBODIMENTS

The embodiments of this application are described in detail below with reference to the accompanying drawings of the specification.

The embodiments of this application may be applied to mobile communications systems of various standards, for example, a new radio (NR) system, a long term evolution (LTE) system, a long term evolution-advanced (LTE-A) system, an evolved long term evolution (eLTE) system, or a future communications system, which is not limited herein.

Figure 1:
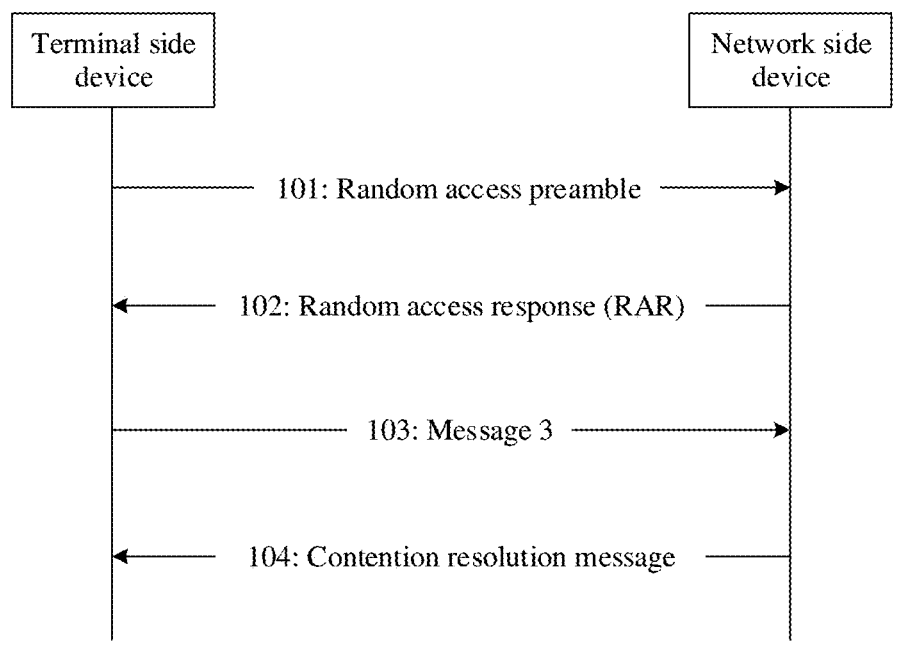
FIG. 1 is a schematic flowchart of a contention-based random access procedure in the prior art.

This embodiment of this application may be applied to a random access procedure. In the prior art, a contention-based random access procedure may be shown in FIG. 1, and mainly includes a four-step message procedure.

Step 101: A terminal side device sends a random access preamble to a network side device, to initiate a random access procedure.

Specifically, the terminal side device autonomously selects a random access preamble, and sends the random access preamble on a random access resource. The random access preamble is also referred to as a random access procedure message 1.

Because a quantity of random access preambles is limited, and when initiating random access, the terminal side device randomly selects the random access preamble, different terminal side devices may select a same random access preamble. If the network side device successfully detects a random access preamble, the network side device sends a random access response (RAR) corresponding to the random access preamble.

Step 102: The network side device sends a random access response to the terminal side device.

The RAR may include an identifier of the random access preamble, timing advance (TA), an uplink grant (UL grant), and a temporary cell radio network temporary identifier (TC-RNTI). The TA is used by the terminal side device to perform uplink timing adjustment, to ensure uplink synchronization. The RAR is also referred to as a random access procedure message 2.

If the terminal side device successfully receives the RAR in a RAR monitoring window, the terminal side device transmits a message 3 on a resource specified by the uplink grant, where the message 3 is scrambled by using a TC-RNTI carried in the RAR.

Step 103: The terminal side device sends a message 3 (msg 3) to the network side device based on the RAR.

To distinguish between different terminal side devices, the terminal side device carries, in the message 3, an identifier that can uniquely identify the terminal side device.

For a terminal side device in a radio resource control (RRC) connected mode, a cell radio network temporary identifiers (C-RNTI) is carried in the message 3 as an identifier of the terminal side device.

For a terminal side device in a non-RRC connected mode, a system architecture evolution temporary mobile subscriber identity (S-TMSI) or a 40-bit random number is used as an identifier of the terminal side device. Specifically, if the terminal side device has never been connected to a core network, a randomly generated 40-bit sequence is used as the identifier of the terminal side device, or if the terminal side device has ever been connected to a core network, an S-TMSI allocated by the core network to the terminal side device is used as the identifier of the terminal side device.

Step 104: The network side device sends a contention resolution message to the terminal side device, where the message may also be referred to as a message 4 (msg 4).

After receiving the message 3 sent by the terminal side device, the network side device sends the contention resolution message to the successfully accessed terminal side device, to specify the terminal side device winning in the contention resolution. Specifically:

For a terminal side device that carries a C-RNTI in the msg 3, the msg 4 is scrambled by using the C-RNTI. If descrambling by the terminal side device by using the C-RNTI of the terminal side device succeeds, it may be determined that the random access succeeds, or if descrambling by the terminal side device by using the C-RNTI of the terminal side device fails, it may be determined that the random access fails.

For a terminal side device that does not carry a C-RNTI in the msg 3, the msg 4 is scrambled by using the TC-RNTI carried in the RAR, and the msg 4 includes an identifier of the terminal side device. If the terminal side device determines that the identifier of the terminal side device included in the msg 4 matches the identifier of the terminal side device carried in the msg 3, it is considered that the random access of the terminal side device succeeds, or if the terminal side device determines that the identifier of the terminal side device included in the msg 4 does not match the identifier of the terminal side device carried in the msg 3, it may be determined that the random access fails. For a terminal side device that successfully performs the random access, the TC-RNTI carried in the RAR becomes a C-RNTI. For another terminal side device that fails the random access, a random access procedure is re-initiated.

As described above, in an existing contention-based random access procedure, when a plurality of terminal side devices initiate random access procedures to a network side device in a same time period, if the plurality of terminal side devices select a same random access preamble, the network side device allows only one terminal side device to access a network, and another terminal side device needs to re-initiate a random access procedure, resulting in a relatively large average random access delay of the terminal side device. Therefore, an embodiment of this application provides a random access method for this scenario, to improve a random access success rate of the terminal side device, and reduce an average random access delay of the terminal side device. Details are described below.

In the embodiments of this application, the terminal side device is a device having a wireless transceiver function or a chip that may be disposed in the device. The device having a wireless transceiver function may also be referred to as user equipment (UE), an access terminal, a subscriber unit, a subscriber station, a mobile station, a remote station, a remote terminal, a mobile device, a user terminal, a user agent, or a user apparatus. In actual application, the terminal side device in the embodiments of this application may be a mobile phone, a tablet computer (Pad), a computer with a wireless transceiver function, a virtual reality (VR) terminal, an augmented reality (AR), a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the foregoing device having a wireless transceiver function and the chip that may be disposed in the device are collectively referred to as the terminal side device.

In the embodiments of this application, the network side device may be a radio access device in various standards, for example, an evolved nodeB (eNB), a radio network controller (RNC) or a nodeB (NB), a base station controller (BSC), a base transceiver station (BTS), a home base station (for example, a home evolved NodeB, or a home NodeB (HNB)), a baseband unit (BBU), an access point (AP) in a wireless fidelity (WIFI) system, a wireless relay node, a wireless backhaul node, a transmission point (TRP or TP), or the like. The network side device may alternatively be a gNB or a TRP or TP in a 5G (NR) system, one or one group of antenna panels (including a plurality of antenna panels) of a base station in the 5G system, or may be a network node that constitutes a gNB or a transmission point, for example, BBU, or may be a DU under a central unit-distributed unit (CU-DU) architecture.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 2:
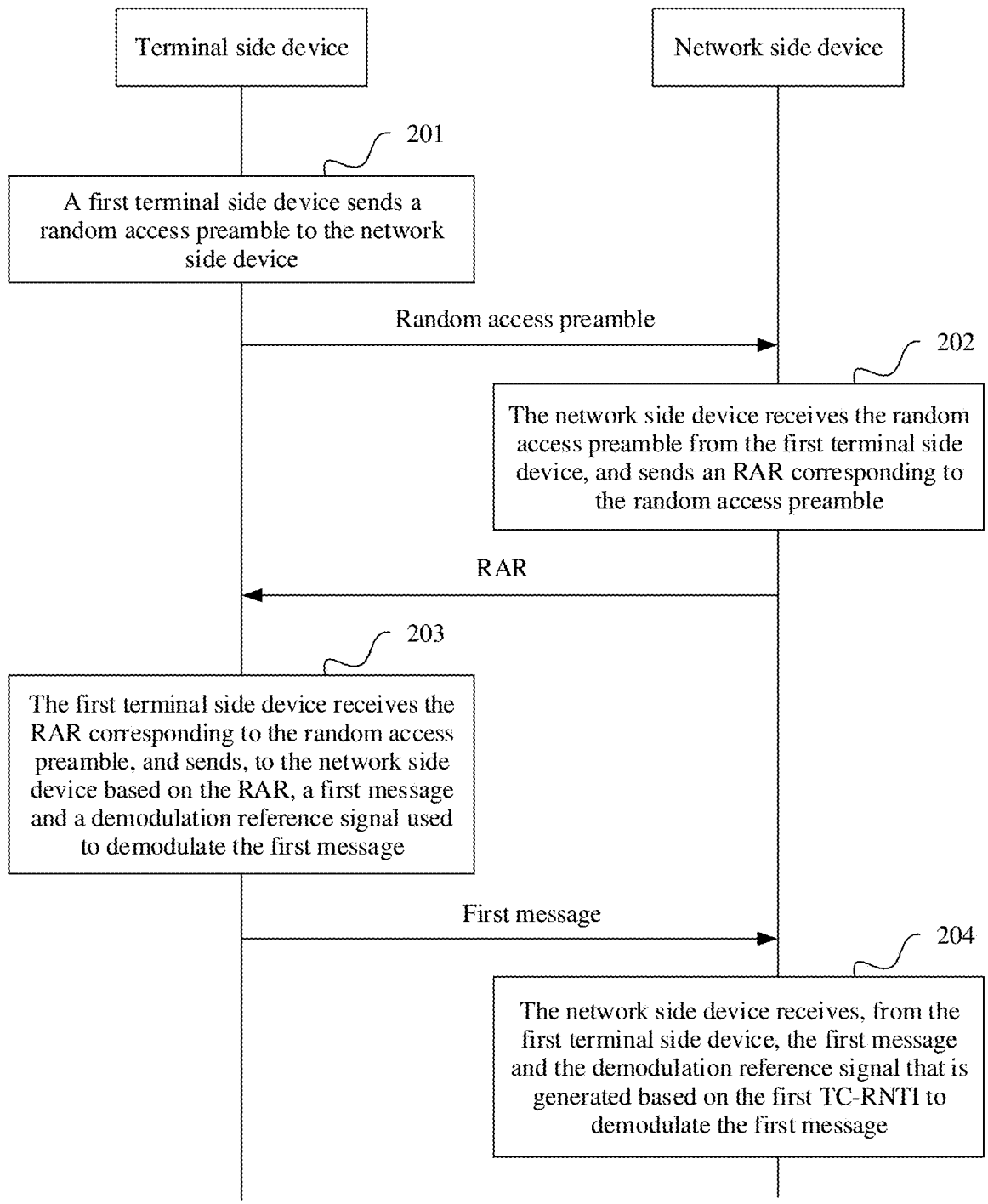
FIG. 2 is a schematic flowchart of a random access method according to an embodiment of this application.

FIG. 2 is a schematic flowchart of a random access method according to an embodiment of this application.

The method includes the following steps.

Step 201: A first terminal side device sends a random access preamble to a network side device.

The random access preamble herein is a random access procedure message 1.

Step 202: The network side device receives the random access preamble from the first terminal side device, and sends an RAR corresponding to the random access preamble.

The RAR includes P TC-RNTIs, and P is an integer greater than 1. The RAR is a random access procedure message 2.

Step 203: The first terminal side device receives the RAR corresponding to the random access preamble, and sends, to the network side device based on the RAR, a first message and a demodulation reference signal used to demodulate the first message.

The demodulation reference signal may be a demodulation reference signal (DMRS).

The demodulation reference signal is generated based on the first TC-RNTI, and the first TC-RNTI is one of the P TC-RNTIs. The first message herein is a random access procedure message 3.

Step 204: The network side device receives, from the first terminal side device, the first message and the demodulation reference signal that is generated based on the first TC-RNTI to demodulate the first message.

In the prior art, terminal side devices that send a same random preamble to a network side device generate a same demodulation reference signal. Therefore, the network side device can neither distinguish between different terminal side devices based on the demodulation reference signal, nor separately demodulate first messages sent by all the terminal side devices. However, in the foregoing solution, the first TC-RNTI is selected by the first terminal side device from the P TC-RNTIs. Therefore, a probability that the demodulation reference signal generated based on the first TC-RNTI is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, because the RAR includes the P TC-RNTIs, theoretically, a maximum of P terminal side devices can simultaneously initiate random access to the network side device, thereby reducing the average random access latency.

In step 201, the random access preamble sent by the first terminal side device is randomly selected from a plurality of random access preambles preconfigured on a network side. For a specific process in which the first terminal side device sends the random access preamble, refer to descriptions in an existing mobile communications system. Details are not described herein again.

In step 202, if the network side device successfully receives the same random access preamble sent by the plurality of terminal side devices, the network side device sends one RAR message to the plurality of terminal side devices.

For example, in step 201, random access preambles selected by the first terminal side device and a second terminal side device are the same. If the network side device successfully receives the random access preambles sent by the first terminal side device and the second terminal side device, the network side device sends an RAR, where the RAR is a response to the random access preamble received by the network side device.

It should be noted that, in a same time period, when random access preambles sent by a plurality of terminal side devices to the network side device are the same, from a perspective of the network side device, the network side device considers the same random access preambles sent by the plurality of terminal side devices as one random access preamble. After the network side device receives the random access preamble, the RAR sent by the network side device is not intended for the terminal side device, but is intended for the received random access preamble. The RAR is sent in a broadcast manner. Therefore, the terminal side device that sends the random access preamble to the network side device may receive the RAR, and determine, based on content of the RAR, whether the RAR is sent to the terminal side device.

Figure 3:
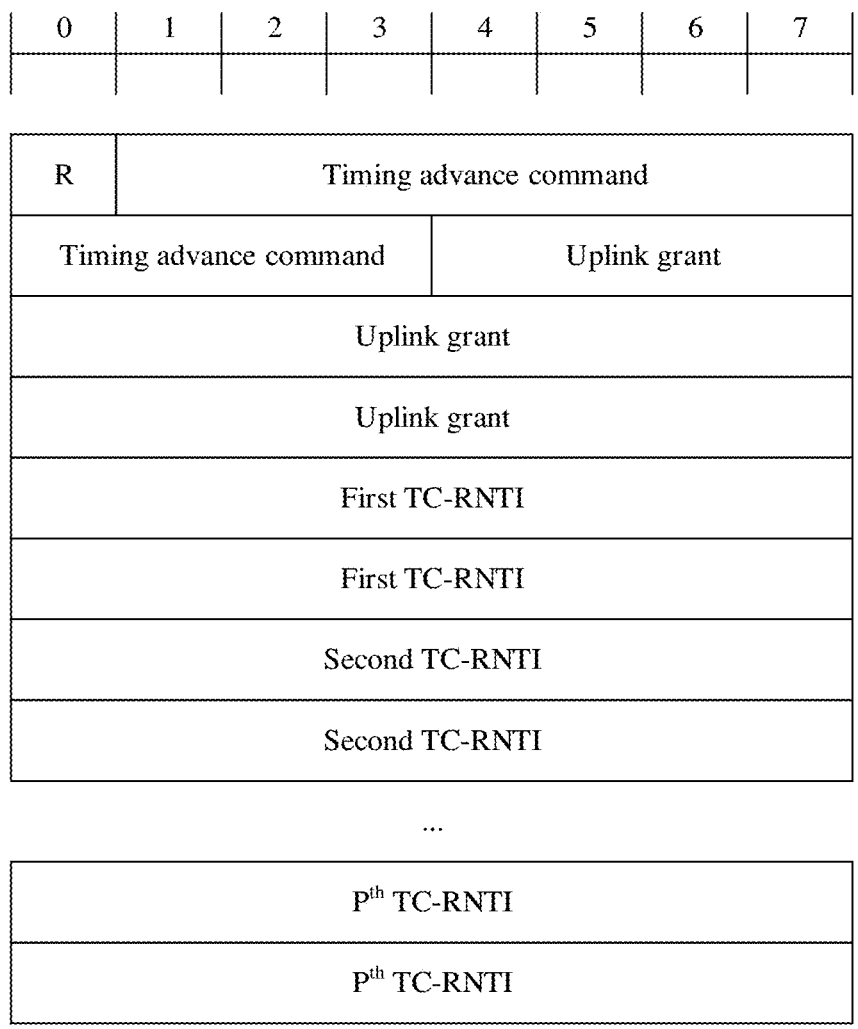
FIG. 3 is a schematic structural diagram of an RAR according to an embodiment of this application.

In this embodiment of this application, the RAR sent by the network side device may be shown in FIG. 3. In FIG. 3, the RAR sent by the network side device includes a reserved bit (R), a timing advance command, a UL grant, and P TC-RNTIs. The RAR sent by the network side device may further include other content, for example, an identifier of the random access preamble, which is not listed one by one herein.

The timing advance command is used by the terminal side device to perform uplink timing adjustment, to ensure uplink synchronization. The UL grant indicates an uplink resource used by the terminal side device to send the first message.

It should be noted that the RAR sent by the network side device is scrambled by using a random access radio network temporary identifier (RA-RNTI), and the RA-RNTI is obtained through calculation based on a time-frequency location at which the random access preamble is sent. For a specific calculation process, refer to the existing mobile communications system. Details are not described herein again.

In step 203, after sending the random access preamble, the first terminal side device detects the RAR in a RAR monitoring window. If it is determined that the detected RAR may be descrambled by using a first RA-RNTI, and the detected RAR includes the identifier of the random access preamble sent by the first terminal side device, it may be determined that the detected RAR is the RAR corresponding to the random access preamble sent by the first terminal side device. The first RA-RNTI is obtained through calculation based on a time-frequency location of the random access preamble sent by the first terminal side device.

Correspondingly, if the first terminal side device does not detect, in the RAR monitoring window, the RAR scrambled by using the first RA-RNTI, it is considered that the random access fails.

After receiving the RAR corresponding to the random access preamble, the first terminal side device randomly selects a TC-RNTI from the P TC-RNTIs as the first TC-RNTI, and generates the demodulation reference signal based on the first TC-RNTI.

When the first terminal side device supports sending uplink data by using different technologies, the demodulation reference signal is generated based on different parameters. Specifically, when the first terminal side device supports sending the uplink data by using a single-carrier frequency division multiple access (SC-FDMA) technology, the demodulation reference signal is generated based on a cyclic shift field or a cyclic shift value, where the cyclic shift field or the cyclic shift value is determined based on the first TC-RNTI.

When the first terminal side device supports sending the uplink data by using the SC-FDMA technology, or supports sending the uplink data by using an orthogonal frequency division multiplexing (OFDM) technology, or supports sending the uplink data by using an SC-FDMA technology and an OFDM technology, the demodulation reference signal is generated based on an antenna port number, and the antenna port number is determined based on the first TC-RNTI.

It should be noted that, when the first terminal side device supports sending the uplink data by using the SC-FDMA technology and the OFDM technology, a specific technology used for sending the uplink data is indicated by the network side device. For example, when determining that signal coverage is relatively poor, the network side device indicates the first terminal side device to send the uplink data by using the SC-FDMA technology, or when determining that signal coverage is relatively good, the network side device indicates the first terminal side device to send the uplink data by using the OFDM technology. For another example, when determining that the first terminal side device does not support a multiple-input multiple-output (MIMO) system, the network side device indicates the first terminal side device to send the uplink data by using the SC-FDMA technology, or when determining that the first terminal side device supports a MIMO system, the network side device indicates the first terminal side device to send the uplink data by using the OFDM technology.

Details are described below.

When the first terminal side device supports sending the uplink data by using the SC-FDMA technology, the demodulation reference signal may be determined according to the following formula:

$$r_{u,v}^{(\alpha)} = e^{j\alpha n} \bar{r}_{u,v} \quad (1),$$

where $\alpha$ is a cyclic shift, $\bar{r}_{u,v}$ is a base sequence, $r_{u,v}^{(\alpha)}$ is a demodulation reference signal obtained after the cyclic shift, U indicates a group number, and V indicates a sequence number in a group. The base sequence is obtained by performing cyclic extension of a Zadoff-Chu sequence. For details, refer to descriptions in the existing mobile communications system. Details are not described herein. After the base sequence is determined, U and V may also be determined.

A calculation formula for the cyclic shift in the formula (1) is:

$$\alpha_\lambda = 2\pi n_{cs,\lambda}/12 \quad (2),$$

where $n_{cs,\lambda} = (n_{DMRS}^{(1)} + n_{DMRS,\lambda}^{(2)} + n_{PN}(n_s)) \bmod 12$, and mod( ) is a modulo operation.

$n_{DMRS}^{(1)}$ is determined by a parameter cyclicShift configured by using higher layer signaling. For example, when the higher layer signaling is radio resource control (RRC) layer signaling, the parameter cyclicShift is located in a system information block (SIB) 2 of the RRC signaling sent by the network side device, as shown in Table 1.

$n_{DMRS,\lambda}^{(2)}$ is a cyclic shift value. For a relationship between the cyclic shift value and the cyclic shift field, refer to Table 2. It should be noted that in the existing mobile communications system, multi-antenna transmission is supported. In a spatial multiplexing scenario, a different demodulation reference signal is used at each layer. Therefore, different cyclic shifts are used. $\lambda$ in Table 2 corresponds to a layer of the demodulation reference signal. The layers refer to different data streams transmitted in parallel, and a maximum quantity of layers is a rank of a channel matrix between the terminal side device and the network side device.

Calculation of $n_{PN}(n_s)$, which is a pseudo-random sequence, is irrelevant to the terminal side device.

TABLE 1

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

TABLE 2

| Cyclic shift field | $n_{DMRS,\lambda}^{(2)}$ | | | |
|---|---|---|---|---|
| | $\lambda = 0$ | $\lambda = 1$ | $\lambda = 2$ | $\lambda = 3$ |
| 000 | 0 | 6 | 3 | 9 |
| 001 | 6 | 0 | 9 | 3 |
| 010 | 3 | 9 | 6 | 0 |
| 011 | 4 | 10 | 7 | 1 |
| 100 | 2 | 8 | 5 | 11 |
| 101 | 8 | 2 | 11 | 5 |
| 110 | 10 | 4 | 1 | 7 |
| 111 | 9 | 3 | 0 | 6 |

It can be learned from the foregoing formula (1) and formula (2) that, if the cyclic shift field or the cyclic shift value is determined, the demodulation reference signal may be calculated.

In this embodiment of this application, the cyclic shift field or the cyclic shift value may be determined in any one of the following manners.

First Possible Implementation.

The cyclic shift field is an index value of the first TC-RNTI.

In this implementation, index values may be set for the P TC-RNTIs, and the first terminal side device may use the index value of the first TC-RNTI as the cyclic shift field. After determining the cyclic shift field, the first terminal side device may determine the cyclic shift value according to Table 2, and then calculate the demodulation reference signal.

For example, when P is 8, the index values of the P TC-RNTIs are 000 to 111. When the index value of the first TC-RNTI determined by the first terminal side device is 100, it is determined that the cyclic shift field is 100. According to Table 2, if $\lambda=0$, when the cyclic shift field is 100, the cyclic shift value is 2, and then the demodulation reference signal may be calculated with reference to the formula (1) and the formula (2).

The implementation is easy to be implemented, and no complex calculation is required, so that efficiency of generating the demodulation reference signal by the first terminal side device can be improved.

Second Possible Implementation.

Each of the P TC-RNTIs has a mapping relationship with a preset value, and the cyclic shift field is a preset value to which the first TC-RNTI is mapped.

For example, when the TC-RNTI is in hexadecimal notation, and when the TC-RNTI is 0001 to 0FFF, a corresponding preset value is 000, when the TC-RNTI is 1000 to 1FFF, a corresponding preset value is 001, when the TC-RNTI is 2000 to 2FFF, a corresponding preset value is ow, or when the TC-RNTI is 3000 to 3FFF, a corresponding preset value is 100. When the first TC-RNTI determined by the first terminal side device is 2000, it is determined that the cyclic shift field is 010. According to Table 2, if $\lambda=0$, when the cyclic shift field is 010, the cyclic shift value is 3, and then the demodulation reference signal may be calculated with reference to the formula (1) and the formula (2).

In this implementation, a quantity of TC-RNTIs included in the RAR may be not limited, and the network side device may determine, based on an actual requirement, the quantity of TC-RNTIs carried in the RAR.

Third Possible Implementation.

The cyclic shift field is mod(the first TC-RNTI, T), T is a quantity of values included in a value range of the cyclic shift field, and mod( ) is a modulo operation.

For example, if the value range of the cyclic shift field is from 0 to 7, there are eight values included in the value range of the cyclic shift field, and the cyclic shift field is mod(the first TC-RNTI, 8).

Fourth possible implementation.

The cyclic shift value is mod(the first TC-RNTI, Y), and Y is a quantity of values included in a value range of the cyclic shift value.

For example, if the value range of the cyclic shift value is from 0 to 11, there are 12 values included in the value range, and the cyclic shift value is mod(the first TC-RNTI, 12).

In this implementation, the first terminal side device may directly determine the cyclic shift value required for generating the demodulation reference signal, so that efficiency of generating the demodulation reference signal by the first terminal side device can be improved.

When the first terminal side device supports sending the uplink data by using the SC-FDMA technology and/or the orthogonal frequency division multiplexing (OFDM) technology, the demodulation reference signal is generated based on an antenna port number, and the antenna port number is determined based on the first TC-RNTI.

Specifically, the demodulation reference signal may be determined according to the following formula:

$$\tilde{a}_{k,l}^{(\tilde{p}_j,\mu)} = w_f(k')w_t(l')r(2n+k')$$

$$k = 4n + 2k' + \Delta$$

$$k' = 0,1$$

$$l = \bar{l} + l'$$

$$n = 0,1,\ldots$$

$$j = 0,1,\ldots,\nu-1 \quad (3)$$

In the formula (3), $\tilde{p}_j$ indicates an antenna port number, and different antenna port numbers correspond to different orthogonal cover codes (OCC), namely, $w_f(k')$ and $w_t(l')$ in Table 3. $r(2n+k')$ is generated based on a pseudo-random sequence. For a specific generation manner, refer to the existing mobile communications system. k indicates a number of a subcarrier in frequency domain in which the demodulation reference signal is located, l is an OFDM number in time domain in which the demodulation reference signal is located, and $\bar{l}$ is related to a location of the demodulation reference signal. A relationship among the antenna port number, $\Delta$, $w_f(k')$, and $w_t(l')$ may be shown in Table 3.

TABLE 3

| Antenna port number | Δ | $w_f(k')$ | | $w_t(l')$ | |
|---|---|---|---|---|---|
| | | k' = 0 | k' = 1 | l' = 0 | l' = 1 |
| 0 | 0 | +1 | +1 | +1 | +1 |
| 1 | 0 | +1 | −1 | +1 | +1 |
| 2 | 1 | +1 | +1 | +1 | +1 |
| 3 | 1 | +1 | −1 | +1 | +1 |
| 4 | 0 | +1 | +1 | +1 | −1 |
| 5 | 0 | +1 | −1 | +1 | −1 |
| 6 | 1 | +1 | +1 | +1 | −1 |
| 7 | 1 | +1 | −1 | +1 | −1 |

It can be learned from the foregoing formula (3) that, if the antenna port number is determined, the orthogonal cover code corresponding to the antenna port number may be determined, so that the demodulation reference signal may be determined according to the formula (3).

In this embodiment of this application, the antenna port number may be determined in any one of the following manners.

First Possible Implementation.

The antenna port number is an index value of the first TC-RNTI.

In this implementation, index values may be set for the P TC-RNTIs, and the first terminal side device may use the index value of the first TC-RNTI as the antenna port number.

For example, when P is 8, the index values of the P TC-RNTIs are 000 to 111. When the index value of the first TC-RNTI determined by the first terminal side device is 100, it is determined that the cyclic shift field is 100.

The implementation is easy to be implemented, and no complex calculation is required, so that efficiency of sending the demodulation reference signal by the first terminal side device can be improved.

Second Possible Implementation.

Each of the P TC-RNTIs has a mapping relationship with a preset value, and the antenna port number is a preset value to which the first TC-RNTI is mapped.

For example, when the TC-RNTI is encoded in hexadecimal, and when the TC-RNTI is 0001 to 0FFF, a corresponding preset value is 000, when the TC-RNTI is 1000 to 1FFF, a corresponding preset value is 001, when the TC-RNTI is 2000 to 2FFF, a corresponding preset value is 010, or when the TC-RNTI is 3000 to 3FFF, a corresponding preset value is 100. When the first TC-RNTI determined by the first terminal side device is 2000, it may be determined that the antenna port number is 010, that is, 3.

In this implementation, a quantity of TC-RNTIs included in the RAR may be not limited, and the network side device may determine, based on an actual requirement, the quantity of TC-RNTIs carried in the RAR.

Third Possible Implementation.

The antenna port number is mod(the first TC-RNTI, U), and U is a quantity of values included in a value range of the antenna port number.

For example, if the value range of the antenna port number is from 0 to 7, there are 8 values included in the value range, and the antenna port number is mod(the first TC-RNTI, 8).

After determining the demodulation reference signal, the first terminal side device may send the demodulation reference signal and the first message to the network side device, where the first message may also be referred to as the message 3. In this embodiment of this application, the first message may be scrambled by using the first TC-RNTI.

In step 204, when the network side device receives demodulation reference signals from a plurality of terminal side devices, for the different received demodulation reference signals, the network side device may separately perform channel estimation based on the demodulation reference signals, and then the network side device may separately demodulate the first message of each terminal side device with reference to a serial interference cancellation (SIC) technology. When successfully demodulating the first message of a certain one of the terminal side device, the network side device sends a contention resolution message to the terminal side device. For a specific demodulation process of the first message, refer to descriptions in the existing mobile communications system. Details are not described herein again.

Correspondingly, for a same received demodulation reference signal sent by a plurality of terminal side devices, because the network side device cannot distinguish between different terminal side devices based on the demodulation reference signal, channel estimation information of the plurality of terminal side devices cannot be obtained, and the network side device cannot successfully demodulate the first message. When the first message fails to be demodulated, the network side device does not send a contention resolution message, and consequently, random access of all the plurality of terminal side devices fails.

For example, if a random access preamble sent by the second terminal side device is the same as the random access preamble sent by the first terminal side device, but a demodulation reference signal sent by the second terminal side device is different from the demodulation reference signal sent by the first terminal side device, the network side device may separately successfully demodulate a first message sent by the second terminal side device and the first message sent by the first terminal side device.

In this embodiment of this application, after receiving the first message, the network side device needs to send a hybrid automatic repeat request (HARQ) feedback of adaptive retransmission for the first message to the first terminal side device. The first terminal side device supports at least one of adaptive retransmission and non-adaptive retransmission in uplink. When the first terminal side device supports the adaptive retransmission in the uplink, the HARQ feedback sent by the network side device to the first terminal side device is carried in downlink control information (DCI). After adding a cyclic redundancy check (CRC) check bit to the DCI, the network side device scrambles the CRC check bit, where a scrambling sequence is determined based on the first TC-RNTI selected by the first terminal side device, so that the terminal side device corresponding to the HARQ feedback may be distinguished by using the scrambling sequence. Correspondingly, when detecting the HARQ feedback, the first terminal side device may determine, based on the scrambling sequence of the CRC check bit, whether the HARQ feedback is sent to the first terminal side device.

It should be noted that, when TC-RNTIs selected by two terminal side devices are the same, the terminal side device further needs to determine, based on the contention resolution message, whether the HARQ feedback is sent to the terminal side device itself. For example, the second terminal side device also selects the first TC-RNTI from the P TC-RNTIs. After the first terminal side device and the second terminal side device receive the contention resolution message, if it is determined that the identifier of the terminal side device included in the contention resolution message corresponds to the first terminal side device, it may be determined that the received HARQ feedback is sent to the first terminal side device. Correspondingly, if it is determined that the identifier of the terminal side device included in the contention resolution message corresponds to the second terminal side device, it may be determined that the received HARQ feedback is sent to the second terminal side device.

When the first terminal side device supports the non-adaptive retransmission in the uplink, the HARQ feedback of the non-adaptive retransmission is carried on a physical hybrid automatic repeat request indicator channel (PHICH). In the prior art, the network side device may distinguish between, based on the demodulation reference signal, the terminal side devices corresponding to the HARQ feedbacks. Therefore, an existing mechanism may still be followed, where the terminal side devices corresponding to the HARQ feedbacks may be distinguished based on the demodulation reference signal. Correspondingly, when detecting the HARQ feedback, the first terminal side device may determine, based on the demodulation reference signal, whether the HARQ feedback is sent to the first terminal side device.

It should be noted that, when demodulation reference signals sent by two terminal side devices are the same, the terminal side device further needs to determine, based on the contention resolution message, whether the HARQ feedback is sent to the terminal side device itself. For example, the demodulation reference signal sent by the second terminal side device is the same as the demodulation reference signal sent by the first terminal side device. After the first terminal side device and the second terminal side device receive the contention resolution message, if it is determined that the identifier of the terminal side device included in the contention resolution message corresponds to the first terminal side device, it may be determined that the received HARQ feedback is sent to the first terminal side device. Correspondingly, if it is determined that the identifier of the terminal side device included in the contention resolution message corresponds to the second terminal side device, it may be determined that the received HARQ feedback is sent to the second terminal side device.

After successfully receiving the first message of the first terminal side device, the network side device may send the contention resolution message to the first terminal side device. The contention resolution message may be scrambled by using the first TC-RNTI. Specifically, when the contention resolution message is scrambled, a used scrambling sequence is determined based on the first TC-RNTI. An example of a calculation manner of a scrambling sequence is as follows:

A code word q of the contention resolution message after channel coding is marked as $b^{(q)}(0), \ldots, b^{(q)}(M_{bit}^{(q)}-1)$, and a scrambled bit is marked as: $\tilde{b}^{(q)}(0), \ldots, \tilde{b}^{(q)}(M_{bit}^{(q)}-1)$, where $\tilde{b}^{(q)}(i)=(b^{(q)}(i)+c^{(q)}(i))\bmod 2$, $c^{(q)}(i)$ is a scrambling sequence, and the scrambling sequence is initialized by using the following formula:

$$c_{init}=n_{RNTI} \cdot 2^{15}+q \cdot 2^{14}+n_{ID},$$

where $n_{RNTI}$ is the first TC-RNTI, and $n_{ID}$ is a cell identifier (ID) of a cell in which the first terminal side device is located.

The contention resolution message may further include an identifier of the first terminal side device. As described above, the identifier of the first terminal side device may be an S-TMSI, or a 40-bit random number generated by the first terminal side device, or in another form. For example, the identifier may alternatively be first six bytes in the first message.

The contention resolution message is carried on a physical downlink shared channel (PDSCH), and DCI of the contention resolution message is carried on a physical downlink control channel. In this embodiment of this application, the CRC check bit corresponding to the DCI in the contention resolution message may also be determined based on the first TC-RNTI. Specifically, the network side device performs error check on the DCI of the contention resolution message by using the CRC check bit. If a payload bit of the DCI of the contention resolution message is $a_0, a_1, a_2, a_3, \ldots, a_{A-1}$, a corresponding CRC check bit is $p_0, p_1, p_2, p_3, \ldots, p_{L-1}$. A is a DCI payload bit length, and L is a check bit length. A bit sequence obtained after the CRC check bit is added to the DCI of the contention resolution message is denoted as: $b_0, b_1, b_2, b_3, \ldots, b_{B-1}$, where B=A+L and $b_k=a_k$, where $k=0,1,2,\ldots,A-1$ $b_k=p_{k-A}$, where $k=A,A+1,A+2,\ldots,A+L-1$ After the CRC check bit is added to the DCI of the contention resolution message, the CRC check bit needs to be scrambled, and a scrambling sequence used for scrambling processing is the first TC-RNTI selected by the first terminal side device: $c_0, c_1, c_2, c_3, \ldots, c_{B-1}$. If the scrambled bit sequence is: $\tilde{c}_0, \tilde{c}_1, \tilde{c}_2, \tilde{c}_3, \ldots, \tilde{c}_{B-1}$, $\tilde{c}_k=b_k$, when $k=0,1,2,\ldots,A-1$ $\tilde{c}_k=(b_k+x_{rnti,k-A})\bmod 2$, when $k=A,A+1,A+2,\ldots,A+15$ Further, in this embodiment of this application, if the first terminal side device successfully receives the contention resolution message, the first terminal side device uses the first TC-RNTI as the C-RNTI, that is, uses the first TC-RNTI as the identifier of the first terminal side device.

In this embodiment of this application, the RAR sent by the network side device may not include the P TC-RNTIs, and the P TC-RNTIs may be preconfigured in the terminal side device, or the network side device may broadcast the P TC-RNTIs by using a system message, so that resources occupied by the RAR can be reduced, thereby improving resource utilization.

Figure 4:
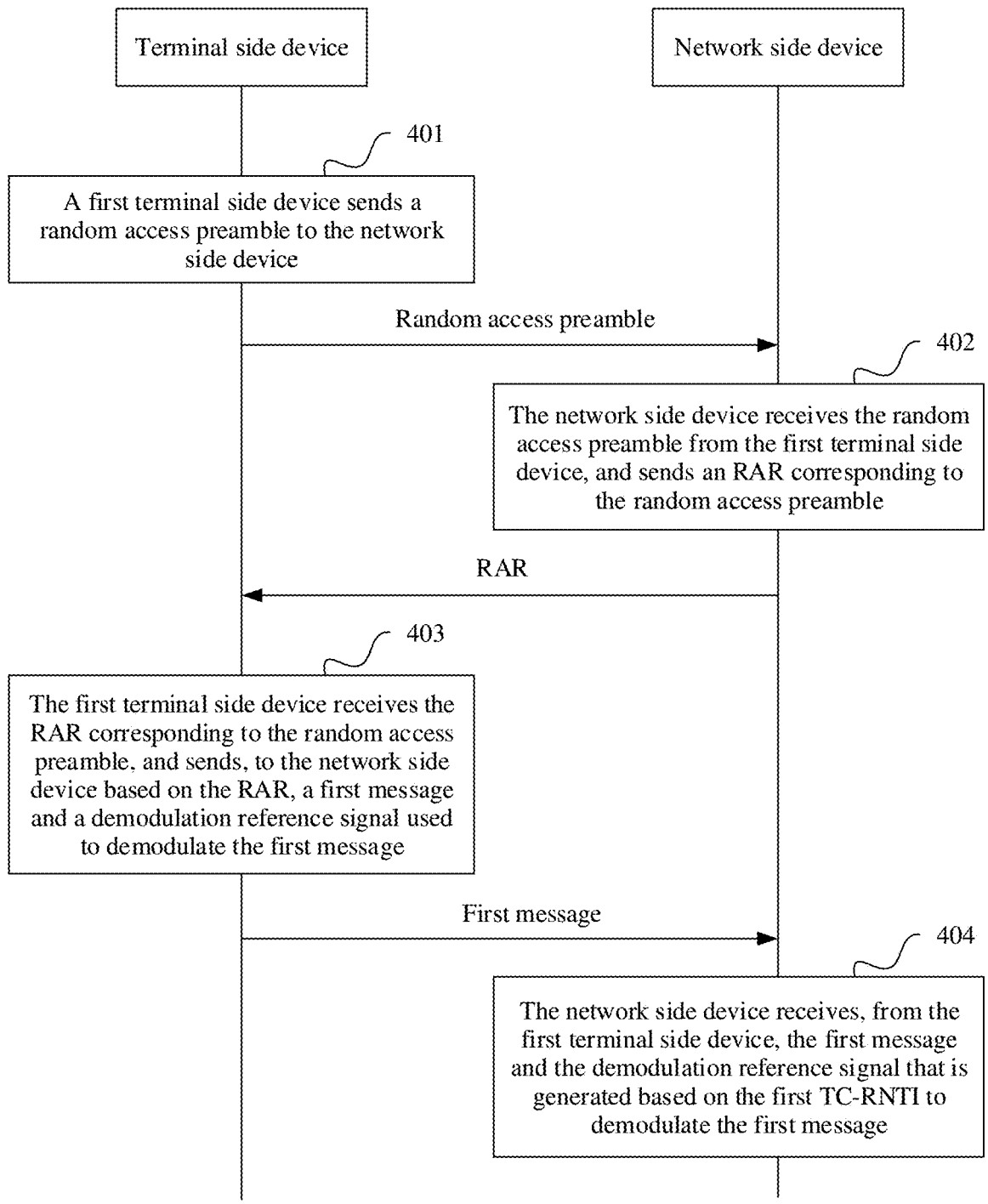
FIG. 4 is a schematic flowchart of a random access method according to an embodiment of this application.

FIG. 4 is a schematic flowchart of a random access method according to an embodiment of this application.

The method includes the following steps.

Step 401: A first terminal side device sends a random access preamble to a network side device.

Step 402: The network side device receives the random access preamble from the first terminal side device, and sends an RAR corresponding to the random access preamble.

The RAR includes identifier indication information, and the identifier indication information is used to indicate the first terminal side device to determine a first TC-RNTI in P TC-RNTIs.

In this embodiment of this application, the P TC-RNTIs may be preconfigured, or the P TC-RNTIs are broadcast by the network side device to the first terminal side device by using a system message.

Step 403: The first terminal side device receives the RAR corresponding to the random access preamble, and sends, to the network side device based on the RAR, a first message and a demodulation reference signal used to demodulate the first message.

The demodulation reference signal is generated based on the first TC-RNTI.

Step 404: The network side device receives, from the first terminal side device, the first message and the demodulation reference signal that is generated based on the first TC-RNTI to demodulate the first message.

The demodulation reference signal is used for demodulating the first message, the demodulation reference signal is generated based on the first TC-RNTI, and the first message is a message sent based on the RAR.

In the foregoing solution, the first TC-RNTI is selected by the first terminal side device from the P TC-RNTIs. Therefore, a probability that the demodulation reference signal generated based on the first TC-RNTI is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, theoretically, a maximum of P terminal side devices can simultaneously initiate random access to the network side device, thereby reducing the average random access latency.

For specific content of step 401, refer to the description in step 201. Details are not described herein again.

In step 402, the identifier indication information is located in the RAR, and the network side device may redefine a bit sequence that is in the RAR and that is used to carry the TC-RNTI, where a redefined bit sequence is used to carry the identifier indication information. Certainly, the network side device may not carry the identifier indication information by redefining the bit sequence that carries the TC-RNTI, but carry the identifier indication information in a newly added field in the RAR.

In this embodiment of this application, a specific form of the identifier indication information is not limited. The identifier indication information may be information pre-agreed on by a network side device and a terminal side device. For example, a value that is not within a value range of the TC-RNTI in an existing mobile communications system may be used as the identifier indication information. After obtaining the identifier indication information, the terminal side device may determine that the TC-RNTI does not need to be obtained from the RAR, but instead, select one TC-RNTI from the P preconfigured TC-RNTIs as the first TC-RNTI, or select one TC-RNTI from the P TC-RNTIs broadcast by the network side device by using the system message as the first TC-RNTI.

Specifically, the RAR sent by the network side device may be shown in FIG. 5. In FIG. 5, the RAR sent by the network side device includes a reserved bit (R), a timing advance command, an UL grant, and identifier indication information. The RAR sent by the network side device may further include other content, for example, an identifier of the random access preamble, which is not listed one by one herein.

The timing advance command is used by the terminal side device to perform uplink timing adjustment, to ensure uplink synchronization. The UL grant indicates an uplink resource used by the terminal side device to send the first message.

It should be noted that the RAR sent by the network side device is scrambled by using an RA-RNTI, and the RA-RNTI is obtained through calculation based on a time-frequency location at which the random access preamble is sent. For a specific calculation process, refer to the existing mobile communications system. Details are not described herein again.

In step 403, for a way in which the first terminal side device determines that a detected RAR is the RAR that corresponds to the random access preamble and that is sent by the first terminal side device, refer to the description in step 203. Details are not described herein again.

After obtaining the identifier indication information in the RAR, the first terminal side device may select one TC-RNTI from the P TC-RNTIs as the first TC-RNTI.

When the first terminal side device supports sending uplink data by using an SC-FDMA technology, the demodulation reference signal is generated based on a cyclic shift field or a cyclic shift value, and the cyclic shift field or the cyclic shift value is determined based on the first TC-RNTI. Details about how to determine the cyclic shift field or the cyclic shift value based on the first TC-RNTI are the same as those described in step 203. Details are not described herein again.

Correspondingly, when the first terminal side device supports sending uplink data by using the SC-FDMA technology and/or the OFDM technology, the demodulation reference signal is generated based on an antenna port number, and the antenna port number is determined based on the first TC-RNTI. Details about how to determine the antenna port number based on the first TC-RNTI are the same as those described in step 203. Details are not described herein again.

In this embodiment of this application, the first message sent by the first terminal side device may be scrambled by using the first TC-RNTI. For a specific scrambling process, refer to descriptions in the existing mobile communications system. Details are not described herein again.

In step 404, how the network side device demodulates the first message based on the demodulation reference signal is the same as that described in step 204. Details are not described herein again.

The network side device may further send a HARQ feedback for the first message to the first terminal side device. For details about how to distinguish between HARQ feedbacks from different terminal side devices, refer to the description in step 204. Details are not described herein again.

Correspondingly, after successfully receiving the first message of the first terminal side device, the network side device may further send a contention resolution message to the first terminal side device. The contention resolution message may be scrambled by using the first TC-RNTI. For a specific scrambling process, refer to the description in step 204. Details are not described herein again.

Other content in step 404 is the same as that described in step 204. Details are not described herein again.

In this embodiment of this application, the network side device may further indicate, to the terminal side device, a parameter for generating the demodulation reference signal, so that the terminal side device can directly generate the demodulation reference signal based on the parameter indicated by the network side device, thereby improving efficiency of generating the demodulation reference signal.

Figure 6:
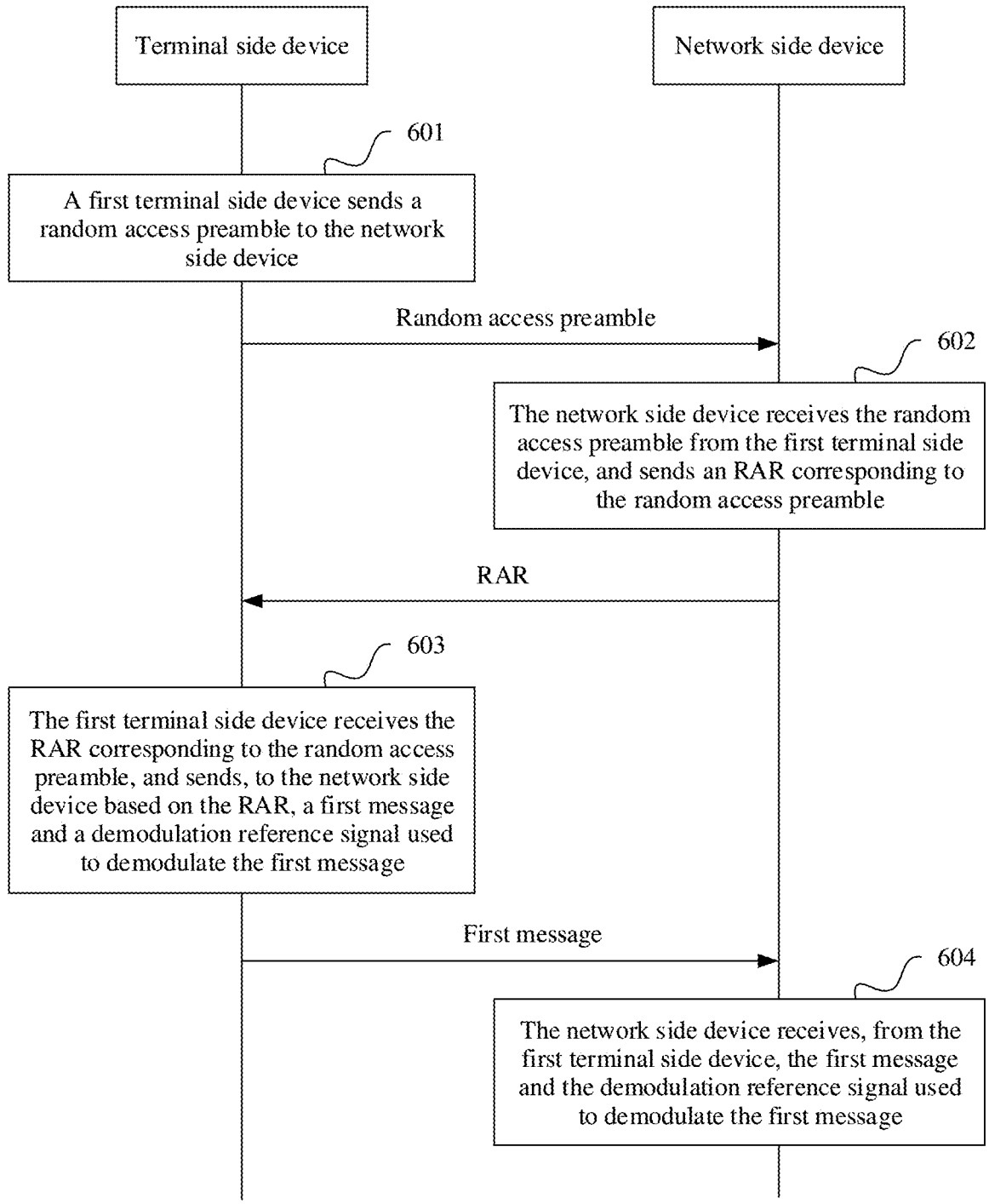
FIG. 6 is a schematic flowchart of a random access method according to an embodiment of this application.

FIG. 6 is a schematic flowchart of a random access method according to an embodiment of this application.

The method includes the following steps.

Step 601: A first terminal side device sends a random access preamble to a network side device.

Step 602: The network side device receives the random access preamble from the first terminal side device, and sends an RAR corresponding to the random access preamble.

The RAR includes parameter indication information, the parameter indication information is used to indicate F parameters, and F is an integer greater than 1.

Step 603: The first terminal side device receives the RAR corresponding to the random access preamble, and sends, to the network side device based on the RAR, a first message and a demodulation reference signal used to demodulate the first message.

The demodulation reference signal is generated based on a first parameter, and the first parameter is one of the F parameters.

Step 604: The network side device receives, from the first terminal side device, the first message and the demodulation reference signal used to demodulate the first message.

In the foregoing solution, the demodulation reference signal is generated by the first terminal side device based on the first parameter selected from the F parameters. Therefore, a probability that the demodulation reference signal generated based on the first parameter is the same as a demodulation reference signal that is received by the network side device and that is generated by another terminal side device is relatively low, so that a probability that the network side device successfully demodulates the first message based on the demodulation reference signal sent by the first terminal side device is relatively high, thereby increasing a probability that the first terminal side device successfully performs random access, and reducing an average random access delay. In addition, in this embodiment of this application, theoretically, a maximum of F terminal side devices can simultaneously initiate random access to the network side device, thereby reducing the average random access latency.

For specific content of step 601, refer to the description in step 201. Details are not described herein again.

In step 602, when the first terminal side device supports sending uplink data by using an SC-FDMA technology, a parameter type of the F parameters indicated by the parameter indication information is a cyclic shift field or a cyclic shift value.

When the first terminal side device supports sending uplink data by using an SC-FDMA technology and/or an OFDM technology, a parameter type of the F parameters indicated by the parameter indication information is an antenna port number.

It can be learned from Table 1 to Table 3 that value ranges of the cyclic shift field, the cyclic shift value, and the antenna port number are specified in the mobile communications system. Therefore, in this embodiment of this application, the F parameters indicated by the parameter indication information may be some or all of values in the value range of the cyclic shift field, or may be some or all of values in the value range of the cyclic shift value, or may be some or all of values in the value range of the antenna port number. Details are described below.

In a first possible implementation, the parameter indication information is a preset value, and the F indicated parameters are all values in the value range of the cyclic shift field, or all values in the value range of the cyclic shift value, or all values in the value range of the antenna port number. For example, when the parameter indication information is 1, F parameters are indicated, and the parameter type of the F parameters is the cyclic shift field. In this case, the F parameters indicated by the parameter indication information are 000 to 111. For another example, when the parameter indication information is 1, F parameters are indicated, and the parameter type of the F parameters is the cyclic shift value. In this case, the F parameters indicated by the parameter indication information are 0 to 11.

In a second possible implementation, a value of the parameter indication information is F−1, and the parameter type of the F indicated parameters is a cyclic shift field whose value range is from 0 to F−1, or is a cyclic shift value whose value range is from 0 to F−1, or are an antenna port number whose value range is from 0 to F−1. For example, when the value of the parameter indication information is 5, and the parameter type of the F parameters is the cyclic shift field, a value range of the F indicated parameters is from 000 to 100. For another example, when the value of the parameter indication information is 5, and the parameter type of the F parameters is the antenna port number, a value range of the F indicated parameters is from 0 to 4.

In a third possible implementation, the parameter indication information includes at least one group of bits, each group of bits includes at least one bit, and each group of bits is mapped to one parameter. For example, each group of bits is mapped to a value within the value range of the cyclic shift field, or each group of bits is mapped to a value within the value range of the cyclic shift value, or each group of bits is mapped to a value within the value range of the antenna port number. For any one of the F parameters, a value of a group of bits to which the parameter is mapped is a first value.

For example, the parameter indication information includes eight groups of bits, where each group of bits includes one bit, and the first value is 1. When the parameter type of the parameters is the cyclic shift field, a value of the cyclic shift field to which each of the eight groups of bits included in the parameter indication information is mapped may be shown in Table 4. With reference to Table 4, when the parameter type of the F parameters is the cyclic shift field, and values of the first group of bits to the eighth group of bits in the parameter indication information are 00110011 in sequence, the F indicated parameters are 010, 011, 110, and 111.

TABLE 4

| Parameter indication information | Cyclic shift field |
|---|---|
| First group of bits | 000 |
| Second group of bits | 001 |
| Third group of bits | 010 |
| Fourth group of bits | 011 |
| Fifth group of bits | 100 |
| Sixth group of bits | 101 |
| Seventh group of bits | 110 |
| Eighth group of bits | 111 |

Certainly, the foregoing is merely an example, and the parameter indication information may alternatively be in another form. Examples are not described one by one herein.

Figure 7:
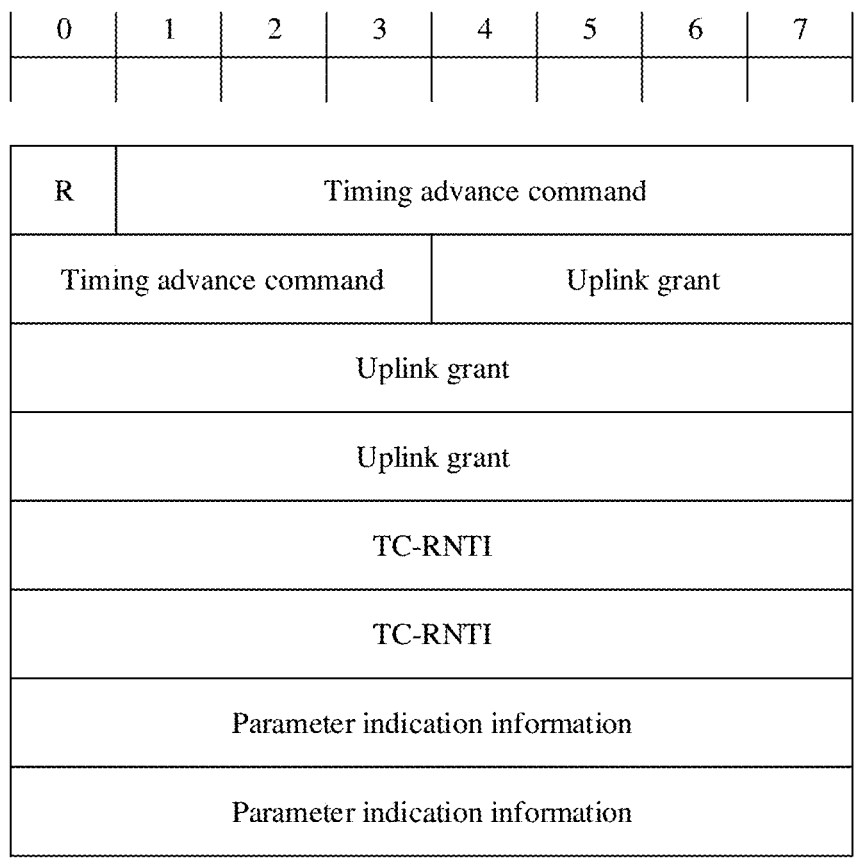
FIG. 7 is a schematic structural diagram of an RAR according to an embodiment of this application.

In this embodiment of this application, the RAR sent by the network side device may be shown in FIG. 7. In FIG. 7, the RAR sent by the network side device includes a reserved bit (R), a timing advance command, an uplink grant, a TC-RNTI, and parameter indication information. The RAR sent by the network side device may further include other content, for example, an identifier of the random access preamble, which is not listed one by one herein.

The timing advance command is used by the terminal side device to perform uplink timing adjustment, to ensure uplink synchronization. The UL grant indicates an uplink resource used by the terminal side device to send the first message.

It should be noted that the RAR sent by the network side device is scrambled by using an RA-RNTI, and the RA- RNTI is obtained through calculation based on a time-frequency location at which the random access preamble is sent. For a specific calculation process, refer to the existing mobile communications system. Details are not described herein again.

In step 603, for a way in which the first terminal side device determines that a detected RAR is the RAR that corresponds to the random access preamble and that is sent by the first terminal side device, refer to the description in step 203. Details are not described herein again.

It should be noted that, in this embodiment of this application, the F parameters indicated by the parameter indication information are pre-agreed parameters. After obtaining the parameter indication information, the first terminal side device may select, from the F parameters indicated by the parameter indication information, one parameter as the first parameter, and generate the demodulation reference signal based on the first parameter. For a specific process of generating the demodulation reference signal, refer to the description in step 603. Details are not described herein again. In the prior art, all parameters used by the terminal side devices to generate the demodulation reference signals are the same. Therefore, compared with the prior art, there is a relatively low probability that the demodulation reference signal generated by the first terminal side device is the same as a demodulation reference signal generated by another terminal side device, to avoid a random access failure caused because the demodulation reference signals are the same.

In this embodiment of this application, the first message sent by the first terminal side device may be scrambled by using the TC-RNTI in the RAR. For a specific scrambling process, refer to descriptions in the existing mobile communications system. Details are not described herein again.

In step 604, how the network side device demodulates the first message based on the demodulation reference signal is the same as that described in step 204. Details are not described herein again.

The network side device may further send a HARQ feedback for the first message to the first terminal side device. For details about how to distinguish between HARQ feedbacks from different terminal side devices, refer to the description in step 204. Details are not described herein again.

Correspondingly, after successfully receiving the first message of the first terminal side device, the network side device may further send a contention resolution message to the first terminal side device. The contention resolution message may be scrambled by using the TC-RNTI in the RAR. For a specific scrambling process, refer to the description in step 204. Details are not described herein again.

Other content in step 604 is the same as that described in step 204. Details are not described herein again.

Figure 8:
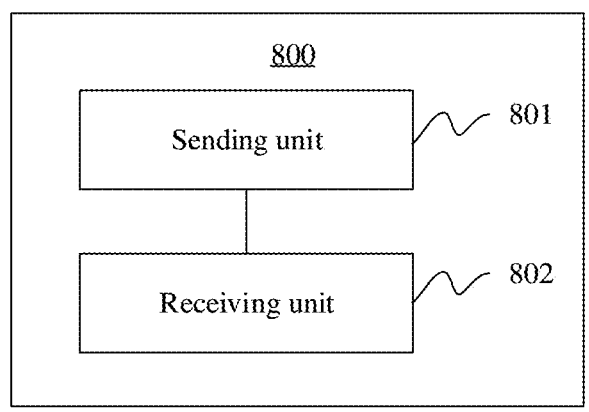
FIG. 8 is a schematic structural diagram of a communications apparatus according to an embodiment of this application.

FIG. 8 is a schematic structural diagram of a communications apparatus according to an embodiment of this application. The communications apparatus may be configured to perform actions of the first terminal side device or the network side device in the foregoing method embodiments. The communications apparatus 800 includes a sending unit 801 and a receiving unit 802.

When the communications apparatus 800 performs an action of the first terminal side device, the sending unit 801 and the receiving unit 802 separately perform the following steps. The sending unit 801 is configured to send a random access preamble to a network side device, the receiving unit 802 is configured to receive a random access response RAR corresponding to the random access preamble, where the RAR includes P temporary cell radio network temporary identifiers TC-RNTIs, and P is an integer greater than 1, and the sending unit 801 is further configured to send, to the network side device based on the RAR, a first message and a demodulation reference signal used to demodulate the first message, where the demodulation reference signal is generated based on the first TC-RNTI, and the first TC-RNTI is one of the P TC-RNTIs.

The communications apparatus 800 may further perform other content. For details, refer to descriptions in steps 201 to 204 and steps 401 to 404. Details are not described herein again.

When the communications apparatus 800 performs an action of the network side device, the sending unit 801 and the receiving unit 802 separately perform the following steps. The receiving unit 802 is configured to receive a random access preamble from a first terminal side device, the sending unit 801 is configured to send a random access response RAR corresponding to the random access preamble, where the RAR includes P temporary cell radio network temporary identifiers TC-RNTIs, and P is an integer greater than 1, and the receiving unit 802 is further configured to receive a first message sent by the first terminal side device based on the RAR, and a demodulation reference signal that is generated based on the first TC-RNTI to demodulate the first message and that is sent by the first terminal side device based on the RAR, where the first TC-RNTI is one of the P TC-RNTIs.

The communications apparatus 800 may further perform other content. For details, refer to descriptions in steps 201 to 204 and steps 401 to 404. Details are not described herein again.

Figure 9:
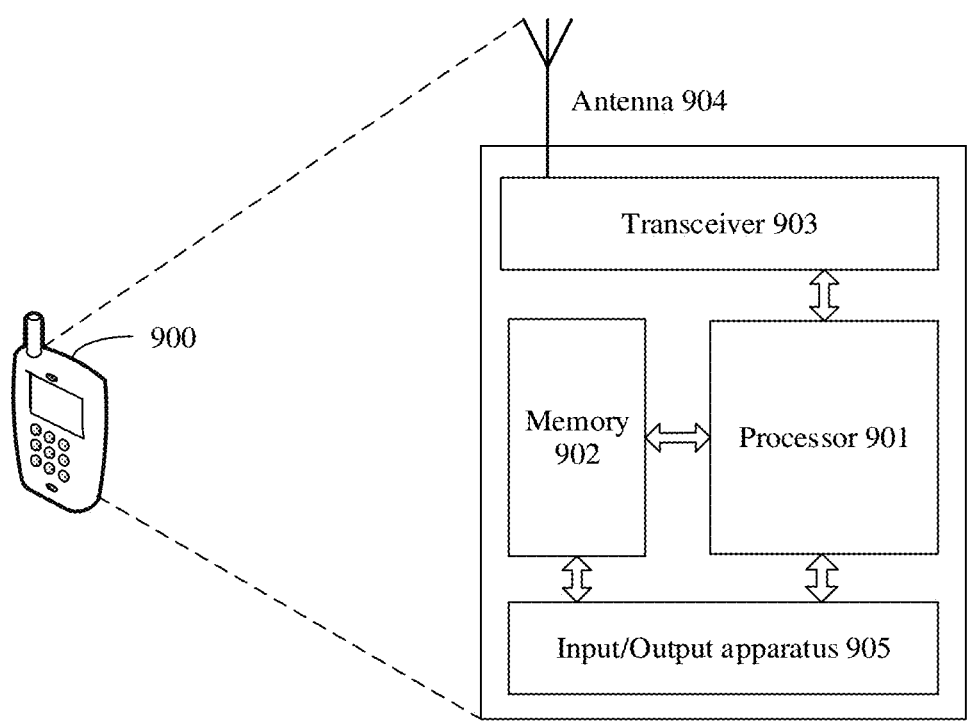
FIG. 9 is a schematic structural diagram of a terminal side device according to an embodiment of this application.

FIG. 9 is a schematic structural diagram of a terminal side device according to an embodiment of this application. The terminal side device shown in FIG. 9 may be an implementation of a hardware circuit of the communications apparatus shown in FIG. 8. The terminal side device may be applicable to the flowchart shown in FIG. 2 or FIG. 4, and performs a function of the first terminal side device in the foregoing method embodiment. For ease of description, FIG. 9 shows only main components of the terminal side device. As shown in FIG. 9, the terminal side device 900 includes a processor 901, a memory 902, a transceiver 903, an antenna 904, and an input/output apparatus 905. The processor 901 is mainly configured to: process a communications protocol and communication data, control the entire wireless communications apparatus, execute a software program, and process data of the software program, for example, configured to support the wireless communications apparatus in performing the actions described in the foregoing method embodiments. The memory 902 is mainly configured to store a software program and data. The transceiver 903 is mainly configured to: perform conversion between a baseband signal and a radio frequency signal, and process the radio frequency signal. The antenna 904 is mainly configured to transmit and receive a radio frequency signal in an electromagnetic wave form. The input/output apparatus 905, for example, a touchscreen, a display, or a keyboard, is mainly configured to receive data input by a user and output data to the user.

The processor 901 in the terminal side device 900 may perform the following steps receiving, by using the transceiver 903, a random access preamble from a first terminal side device, sending, by using the transceiver 903, a random access response RAR corresponding to the random access preamble, where the RAR includes P temporary cell radio network temporary identifiers TC-RNTIs, and P is an integer greater than 1, and receiving, by using the transceiver 903, a first message sent by the first terminal side device based on the RAR, and a demodulation reference signal that is generated based on the first TC-RNTI to demodulate the first message and that is sent by the first terminal side device based on the RAR, where the first TC-RNTI is one of the P TC-RNTIs.

Alternatively, the processor 901 may further perform the following steps:

sending, by using the transceiver 903, a random access preamble to a network side device, receiving, by using the transceiver 903, a random access response RAR corresponding to the random access preamble, where the RAR includes identifier indication information, and the identifier indication information is used to indicate the first terminal side device to determine a first TC-RNTI in P temporary cell radio network temporary identifiers TC-RNTIs, and sending, by using the transceiver 903 to the network side device based on the RAR, a first message and a demodulation reference signal that is generated based on the first TC-RNTI to demodulate the first message.

The terminal side device 900 may further perform other content. For details, refer to descriptions in steps 201 to 204 and steps 401 to 404. Details are not described herein again.

Figure 10:
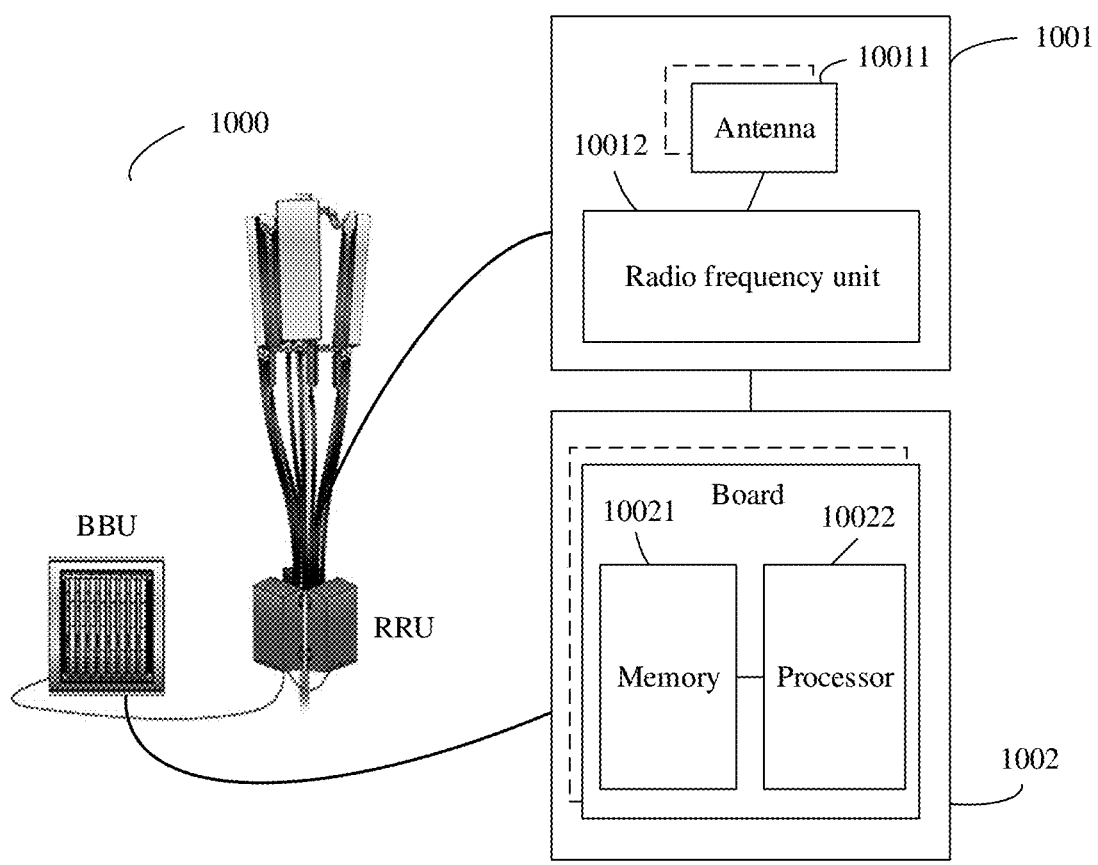
FIG. 10 is a schematic structural diagram of a network side device according to an embodiment of this application.

FIG. 10 is a schematic structural diagram of a network side device, and the network side device may be applied to the method shown in FIG. 3. The network side device 1000 includes one or more remote radio units (RRU) 1001 and one or more baseband units (BBU) 1002. The RRU 1001 may be referred to as a transceiver unit, a transceiver, a transceiver circuit, a transceiver, or the like, and may include at least one antenna 10011 and a radio frequency unit 10012. The RRU 1001 is mainly configured to: transmit and receive a radio frequency signal, and perform conversion between the radio frequency signal and a baseband signal, for example, configured to send a signaling indication or the reference signal in the foregoing embodiment to a terminal. The BBU 1002 is mainly configured to: perform baseband processing, control the network side device, and the like. The RRU 1001 and the BBU 1002 may be physically disposed together, or may be physically separated, that is, a distributed base station.

The BBU 1002 is a control center of the network side device, may also be referred to as a processing unit, and is mainly configured to complete a baseband processing function such as channel coding, multiplexing, modulation, and spectrum spreading. In an example, the BBU 1002 may include one or more boards, and a plurality of boards may jointly support a radio access network (such as a 5G network) in a single access standard, or may separately support radio access networks in different access standards. The BBU 1002 further includes a memory 10021 and a processor 10022. The memory 10021 is configured to store a necessary instruction and necessary data. The processor 10022 is configured to control the network side device to perform a necessary action. The memory 10021 and the processor 10022 may serve the one or more boards. In other words, a memory and a processor may be separately disposed on each board. Alternatively, the plurality of boards may share a same memory and processor. In addition, a necessary circuit is further disposed on each board.

The network side device 1000 may be configured to implement the method in the foregoing method embodiment. Specifically:

The processor 10022 in the network side device 1000 may perform the following steps receiving, by using the radio frequency unit 10012, a random access preamble from a first terminal side device, sending, by using the radio frequency unit 10012, a random access response RAR corresponding to the random access preamble, where the RAR includes P temporary cell radio network temporary identifiers TC-RNTIs, and P is an integer greater than 1, and receiving, by using the radio frequency unit 10012, a first message sent by the first terminal side device based on the RAR, and a demodulation reference signal that is generated based on the first TC-RNTI to demodulate the first message and that is sent by the first terminal side device based on the RAR, where the first TC-RNTI is one of the P TC-RNTIs.

Alternatively, the processor 10022 in the network side device 1000 may further perform the following steps receiving, by using the radio frequency unit 10012, a random access preamble from a first terminal side device, sending, by using the radio frequency unit 10012, a random access response RAR corresponding to the random access preamble, where the RAR includes identifier indication information, and the identifier indication information is used to indicate the first terminal side device to determine a first TC-RNTI in P temporary cell radio network temporary identifiers TC-RNTIs, and receiving, by using the radio frequency unit 10012, a first message sent by the first terminal side device based on the RAR, and a demodulation reference signal that is generated based on the first TC-RNTI to demodulate the first message and that is sent by the first terminal side device based on the RAR.

The network side device 1000 may further perform other content. For details, refer to descriptions in steps 201 to 204 and steps 401 to 404. Details are not described herein again.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A random access method, comprising:
   sending, by a first terminal side device, a random access preamble to a network side device;
   receiving, by the first terminal side device, a random access response (RAR) corresponding to the random access preamble, wherein the RAR comprises P temporary cell radio network temporary identifiers (TC-RNTIs), and wherein P is an integer greater than 1; and
   sending, by the first terminal side device, to the network side device, according to the RAR, a first message and a demodulation reference signal used to demodulate the first message, wherein the demodulation reference signal is generated according to a first TC-RNTI, and wherein the first TC-RNTI is one of the P TC-RNTIs.

2. The method according to claim 1, wherein the first terminal side device supports sending uplink data by using a single-carrier frequency division multiple access (SC-FDMA) technology, wherein the demodulation reference signal is generated according to at least one of a cyclic shift field or a cyclic shift value, and wherein the at least one of the cyclic shift field or the cyclic shift value is determined according to the first TC-RNTI.

3. The method according to claim 2, wherein the cyclic shift field is an index value of the first TC-RNTI.

4. The method according to claim 2, wherein each TC-RNTI of the P TC-RNTIs has a mapping relationship with a preset value, and wherein the cyclic shift field is a preset value to which the first TC-RNTI is mapped.

5. The method according to claim 2, wherein the cyclic shift field is mod(the first TC-RNTI, T), wherein T is a quantity of values in a value range of the cyclic shift field, and wherein mod( ) is a modulo operation.

6. The method according to claim 5, wherein the cyclic shift value is mod(the first TC-RNTI, Y), and wherein Y is a quantity of values in a value range of the cyclic shift value.

7. The method according to claim 1, wherein the first terminal side device supports sending uplink data by using at least one of a single-carrier frequency division multiple access (SC-FDMA) or an orthogonal frequency division multiplexing (OFDM) technology, wherein the demodulation reference signal is generated based on an antenna port number, and wherein the antenna port number is determined based on the first TC-RNTI.

8. The method according to claim 7, wherein the antenna port number is an index value of the first TC-RNTI.

9. The method according to claim 7, wherein each TC-RNTI of the P TC-RNTIs has a mapping relationship with a preset value, and wherein the antenna port number is a preset value to which the first TC-RNTI is mapped.

10. The method according to claim 7, wherein the antenna port number is mod(the first TC-RNTI, U), and wherein U is a quantity of values in a value range of the antenna port number.

11. An apparatus, comprising:
a processor; and
a memory coupled to the processor and having instructions stored thereon for execution by the processor, the instructions including instructions for:
sending a random access preamble to a network side device;
receiving a random access response (RAR) corresponding to the random access preamble, wherein the RAR comprises P temporary cell radio network temporary identifiers (TC-RNTIs), and wherein P is an integer greater than 1; and
sending to the network side device based on the RAR, a first message and a demodulation reference signal used to demodulate the first message, wherein the demodulation reference signal is generated according to a first TC-RNTI, and wherein the first TC-RNTI is one of the P TC-RNTIs.

12. The apparatus according to claim 11, wherein the apparatus supports sending uplink data by using a single-carrier frequency division multiple access (SC-FDMA) technology, wherein the demodulation reference signal is generated according to at least one of a cyclic shift field or a cyclic shift value, and wherein the at least one of the cyclic shift field or the cyclic shift value is determined according to the first TC-RNTI.

13. The apparatus according to claim 12, wherein the cyclic shift field is an index value of the first TC-RNTI.

14. The apparatus according to claim 12, wherein each TC-RNTI of the P TC-RNTIs has a mapping relationship with a preset value, and wherein the cyclic shift field is a preset value to which the first TC-RNTI is mapped.

15. The apparatus according to claim 12, wherein the cyclic shift field is mod(the first TC-RNTI, T), wherein T is a quantity of values in a value range of the cyclic shift field, and wherein mod( ) is a modulo operation.

16. The apparatus according to claim 15, wherein the cyclic shift value is mod(the first TC-RNTI, Y), and wherein Y is a quantity of values in a value range of the cyclic shift value.

17. The apparatus according to claim 11, wherein the apparatus supports sending uplink data by using at least one of a single-carrier frequency division multiple access (SC-FDMA) or an orthogonal frequency division multiplexing (OFDM) technology, wherein the demodulation reference signal is generated according to an antenna port number, and wherein the antenna port number is determined according to the first TC-RNTI.

18. The apparatus according to claim 17, wherein the antenna port number is an index value of the first TC-RNTI.

19. The apparatus according to claim 17, wherein each TC-RNTI of the P TC-RNTIs has a mapping relationship with a preset value, and wherein the antenna port number is a preset value to which the first TC-RNTI is mapped.

20. The apparatus according to claim 17, wherein the antenna port number is mod(the first TC-RNTI, U), and wherein U is a quantity of values comprised in a value range of the antenna port number.

* * * * *